United States Patent
Tian et al.

(10) Patent No.: US 9,930,552 B2
(45) Date of Patent: Mar. 27, 2018

(54) METHOD FOR INDICATING CHANNEL MEASUREMENT FEEDBACK AND SENDING STATION

(75) Inventors: Kaibo Tian, Shenzhen (CN); Jing Jiang, Shenzhen (CN); Weimin Xing, Shenzhen (CN); Anming Jiang, Shenzhen (CN)

(73) Assignee: ZTE CORPORATION (CN)

( * ) Notice: Subject to any disclaimer, the term of this patent is extended or adjusted under 35 U.S.C. 154(b) by 271 days.

(21) Appl. No.: 14/386,967

(22) PCT Filed: May 29, 2012

(86) PCT No.: PCT/CN2012/076234
§ 371 (c)(1),
(2), (4) Date: Sep. 22, 2014

(87) PCT Pub. No.: WO2013/139087
PCT Pub. Date: Sep. 26, 2013

(65) Prior Publication Data
US 2015/0049701 A1 Feb. 19, 2015

(30) Foreign Application Priority Data
Mar. 22, 2012 (CN) .......................... 2012 1 0077762

(51) Int. Cl.
*H04W 24/10* (2009.01)
*H04W 72/04* (2009.01)
(Continued)

(52) U.S. Cl.
CPC ............ *H04W 24/10* (2013.01); *H04B 17/24* (2015.01); *H04B 17/309* (2015.01);
(Continued)

(58) Field of Classification Search
CPC .............. H04W 24/10; H04W 72/0446; H04L 1/0026; H04L 1/0027
See application file for complete search history.

(56) References Cited

U.S. PATENT DOCUMENTS

2005/0152387 A1* 7/2005 Utsunomiya .......... H04B 7/061
370/431
2007/0171933 A1* 7/2007 Sammour ......... H04W 74/0816
370/447
(Continued)

FOREIGN PATENT DOCUMENTS

| CN | 1708042 | 12/2005 |
|---|---|---|
| CN | 101478786 | 7/2009 |

(Continued)

OTHER PUBLICATIONS

International Search Report for International Patent Application No. PCT/CN2012/076234, dated Jan. 3, 2013.
European Search Report, EP12871951, dated Oct. 14, 2015.

*Primary Examiner* — Chi H Pham
*Assistant Examiner* — Weibin Huang
(74) *Attorney, Agent, or Firm* — McAndrews, Held & Malloy, Ltd.

(57) ABSTRACT

Disclosed are a method for indicating channel measurement feedback and a sending station. The method comprises: a sending station sends a radio frame, wherein a signal field, which is in the physical layer header of the radio frame, carries indication information requesting channel measurement feedback. The disclosure effectively reduces the transmission load overhead for sending the radio frame when requesting channel measurement feedback, thereby reducing the power consumption of a station.

18 Claims, 3 Drawing Sheets a sending station sends a radio frame, wherein signal field, which is in the physical layer header of the radio frame, carries indication information requesting channel measurement feedback — S202 a receiving station receives the radio frame and feeds back to the sending station the channel measurement information indicated by the indication information requesting the channel measurement feedback — S204

(51) Int. Cl.
    *H04L 1/00*      (2006.01)
    *H04B 17/309*    (2015.01)
    *H04B 17/24*     (2015.01)

(52) U.S. Cl.
    CPC .......... *H04L 1/0025* (2013.01); *H04L 1/0028* (2013.01); *H04W 72/0446* (2013.01)

(56) References Cited

U.S. PATENT DOCUMENTS

| | | | | |
|---|---|---|---|---|
| 2009/0207765 A1* | 8/2009 | Yamaura | ............... | H04B 7/0417 |
| | | | | 370/310 |
| 2013/0089124 A1* | 4/2013 | Kim | ....................... | H04B 3/542 |
| | | | | 375/222 |
| 2013/0155953 A1* | 6/2013 | Chu | ...................... | H04W 28/20 |
| | | | | 370/328 |
| 2013/0272347 A1* | 10/2013 | Merlin | .................... | H04B 1/38 |
| | | | | 375/219 |

FOREIGN PATENT DOCUMENTS

| | | |
|---|---|---|
| CN | 101714964 | 5/2010 |
| CN | 102170336 | 8/2011 |
| EP | 1589704 A2 | 10/2005 |
| EP | 1589704 A3 | 10/2005 |
| WO | 2012170864 A2 | 12/2012 |
| WO | 2012170864 A3 | 12/2012 |
| WO | 2012170864 A8 | 12/2012 |
| WO | 2013130846 A1 | 9/2013 |

\* cited by examiner

METHOD FOR INDICATING CHANNEL MEASUREMENT FEEDBACK AND SENDING STATION

CROSS-REFERENCE TO RELATED APPLICATIONS/INCORPORATION BY REFERENCE

This application is a 371 of International Patent Application No. PCT/CN2012/076234, filed May 29, 2012, which claims priority to Chinese Patent Application No. 201210077762.2, filed Mar. 22, 2012, entitled "Method For Indicating Channel Measurement Feedback and Sendinn Station". The above-identified applications are hereby incorporated herein by reference in their entirety.

FIELD

The disclosure relates to the communication field, and in particular to a method for indicating channel measurement feedback and sending station.

BACKGROUND

Currently, in the field of wireless networks, the wireless local area network (WLAN in short) develops rapidly, and the demand on WEAN coverage in the world is increasing. The industrial specification 802.11 work group of Institute for Electrical and Electronic Engineers (IEEE in short) defined a series of WLAN technology standards such as 802.11a, 802.11b, 802.11g and so on, which mainly specified physical layer protocol (PHY in short) and media access control (MAC in short) layer specifications. Other task groups appear in the following which are dedicated to developing specifications involving existing 802.11 technology improvements, for example, the 802.11ab task group mainly involves the utilization of resources of permit-free hands below 1 GHz band, for supporting new applications such as intelligent grid, sensor network and cellular network load balance and so on.

When formulating the technology specifications thereof, the 802.11ah wishes that the technology specifications of 802.11ab follow the technology specifications of the existing 802.11 as much as possible, and at the same time in order to meet the special attributes of 802.11ah itself, also makes proper modifications or formulates new technology specifications regarding the existing technology specifications. Currently, the 802.11ah task group determines that the operating bandwidth of the technology can be 1/2/418/16 MHz, the orthogonal frequency division multiplexing (OFDM in short) modulation technology is employed, the duration of each OFDM symbol (containing a long protection interval) is 40 μs, which is 10 times expanded relative to the duration of each OFDM symbol in the existing 802.11 series standards. In other words, for sending the same information, the energy consumption of the device which employs 802.11ah technology specifications will be 10 times of that of the device which meets the existing 802.11 technology specifications, however, the device which meets the 802.11ah technology specifications has relatively high requirements in terms of energy saving, which thus requires to complete corresponding functions in a shorter information transmission manner.

In the existing 802.11 technology specifications, the basic network architecture thereof is that one access point (AP in short) and a plurality of non-AP stations (STA in short) associated with the AP form a basic service set (BSS in short), and each basic service set has a basic service set identifier (BSSID in short). When performing closed loop multi-antenna transmission, such as Beamforming transmission, the initiator Beamformer has to learn the channel information between itself and the receiver Beamformee, then it requires the Beamformee to perform channel measurement and feed the channel measurement information back to the Beamformer. If the Beamformee does not perform feedback immediately after performing channel measurement, or an error occurs in the channel measurement feedback information received by the Beamformer, then the Beamformer will send a beamforming report poll frame to request the Beamformee to feed back all the channel measurement information or the portion of channel measurement information which is not received by the Beamformer correctly. The format of the current beamforming report poll frame is as shown in FIG. 1, it can be seen from FIG. 1 that there are few loads on the MAC frame of the beamforming report poll frame, and the MAC frame may be re-designed, and the functions thereof may be completed with fewer resources.

In the existing 802.11 technology specifications, the signal field in the physical layer header of a radio frame usually contains a LENGTH/DURATION sub-field, an STBC sub-field, a modulation and coding scheme (MCS in short) sub-field, a coding type sub-field, a cyclic redundancy code (CRC) sub-field and a reserved bit sub-field and so on. The signal field is referred to as common signal field here and is usually followed by a physical frame load, and the information of some subfields in the signal field is usually corresponding to the physical frame load, such as MCS subfield, for indicating the modulation and coding scheme used by the load on the physical frame, if a radio frame does not carry a physical layer load, then some subfields, such as MCS subfield, in the signal field of the physical layer header has no meaning.

SUMMARY

With respect to the problem in the related art that there are fewer loads on the radio frame which requests channel measurement feedback, causing resource waste and being incapable of meeting energy-saving demand, the disclosure provides a method for indicating channel measurement feedback and a sending station, so as to at least solve the above-mentioned problem.

According to one aspect of the disclosure, a method for indicating channel measurement feedback is provided, comprising: a sending station sending a radio frame, wherein a signal field, which is in a physical layer header of the radio frame, carries indication information requesting channel measurement feedback.

Preferably, the indication information requesting channel measurement feedback comprises: frame type information and fragment retransmission bitmap information.

Preferably, when the sending station sends the radio frame, the frame type information is carried through a combination of one or more bits in the signal field which is in the physical layer header of the radio frame.

Preferably, when the sending station sends the radio frame, one or more subfields in the signal field, which is in the physical layer header of the radio frame, are multiplexed to carry the frame type information.

Preferably, multiplexing the one or more subfields in the signal field, which is in the physical layer header of the radio frame, to carry the frame type information comprises: multiplexing a modulation and coding scheme (MCS) subfield in the signal field, which is in the physical layer header of the radio frame, to carry the frame type information, and indicating the frame type of the radio frame via the value of the MCS subfield, wherein if the value of the MCS subfield is a preset value, then the radio frame is one which requests channel measurement feedback, or multiplexing the MCS subfield and other subfields in the common signal field, which is in the physical layer header of the radio frame, to carry the frame type information, and indicating the frame type of the radio frame via a combination value of the MCS subfield and the other subfield, wherein if the combination value is a preset value, then the radio frame is one which requests the channel measurement feedback.

Preferably, the signal field, also carries address information.

Preferably, when the radio frame is sent to an access point (AP) by a station (STA) or is sent to the STA by the AP, the address information comprises: an associated identifier (AID) of the STA.

Preferably, the address information comprises: receiving address information and sending address information, wherein when the radio frame is sent to an access point (AP) by a station (SAT), the receiving address information is partial basic service set identifier (BSSID) of the AP, and the sending address information is the associated identifier (AID) of the STA, wherein the partial BSSID is a compressed BSSID; or when the radio frame is sent to an STA by an AP, the receiving address information is the AID of the STA, and the sending address information is the partial BSSID of the AP.

Preferably, the signal field, also carries cyclic redundancy check information, wherein the cyclic redundancy check information comprises: check information of the signal field information, or the joint check information of the signal field information and additional information.

Preferably, the additional information is BSSID information, or partial BSSID information, wherein the partial BSSID information is compressed BSSID information.

Preferably, the signal field also carries reserved channel access time.

Preferably, the physical layer header of the radio frame also comprises: a short training sequence field and a long training sequence field, wherein the long training sequence field consists of a plurality of orthogonal frequency division multiplexing (OFDM) symbols.

Preferably, it is indicated that the signal field, which is in the physical layer header of the radio frame, is not the common signal field through the phase difference between at least two OFDM symbols in the long training sequence field.

Preferably, the radio frame merely comprises the physical layer header.

According to another aspect of the disclosure, a sending station is provided, comprising: a processing module configured to carry indication information requesting channel measurement feedback in a signal field, which is in a physical to layer header of a radio frame; and a sending module configured to send the radio frame.

Preferably, the indication information requesting the channel measurement feedback comprises: frame type information and fragment retransmission bitmap information.

Preferably, the processing module carries the frame type information through a combination of one or more bits in the signal field which is in the physical layer header of the radio frame.

Preferably, the processing module is configured to carry the frame type information by multiplexing the one or more subfields in the signal field which is in the physical layer header of the radio frame.

Preferably, the processing module multiplexes the one or more subfields in the signal field, which is in the physical layer header of the radio frame, to carry the frame type information through the following manner: multiplexing a modulation and coding scheme (MCS) subfield in the signal field, which is in the physical layer header of the radio frame, to carry the frame type information, and indicating a frame type of the radio frame via a value of the MCS subfield, wherein if the value of the MCS subfield is a preset value, then the radio frame is one which requests the channel measurement feedback; or multiplexing the MCS subfield and other subfields in a common signal field, which is in the physical layer header of the radio frame, to carry the frame type information, and indicating the frame type of the radio frame via a combination value of the MCS subfield and the other subfields, wherein if the combination value is a preset value, then the radio frame is one which requests the channel measurement feedback.

Preferably, the physical layer header of the radio frame also comprises: a short training sequence field and a long training sequence field, wherein the long training sequence field consists of a plurality of orthogonal frequency division multiplexing (OFDM) symbols.

Preferably, it is indicated that the signal field, which is in the physical layer header of the radio frame, is not a common signal field through a phase difference between at least two OFDM symbols in the long training, sequence field.

Preferably, the radio frame merely comprises the physical layer header.

According to one aspect of the disclosure, a receiving station is provided, comprising: a receiving module configured to receive a radio frame which is sent by a sending station and carries indication information requesting channel measurement feedback, wherein the indication information requesting the channel measurement feedback is carried in a signal field which is in the physical layer header of the radio frame; and a sending module configured to feed back channel measurement information, which is indicated by the indication information requesting the channel measurement feedback, to the sending station.

Preferably, the indication information requesting the channel measurement feedback may comprise: frame type information and fragment retransmission bitmap information; and the sending module comprises: a detecting unit configured to detect whether the radio frame is one which requests the channel measurement feedback according to the frame type information; and a sending unit configured to, if the detecting result is yes, send the channel measurement feedback information, which is indicated by the fragment transmission bitmap information, to the sending station.

Preferably, the frame type information is carried in one or more subfields of the signal field; and the detecting unit detects whether the radio frame is one which requests the channel, measurement feedback through the following manner: detecting whether the values of the one or more subfields are preset values, if yes, then determining that the received radio frame is one Which requests the channel measurement feedback, otherwise, determining that the received radio frame is not a. radio frame which requests the channel measurement feedback.

Preferably, the physical layer header further comprises: a short training sequence field and a long training sequence field; and the detecting unit detects whether the radio frame is one which requests the channel measurement feedback in the following manner: detecting whether there is a phase difference between at least two OFDM symbols in the long training sequence field of the radio frame, if yes, then determining that the signal field of this radio frame is not a common signal field, and determining whether the radio frame is one which requests the channel measurement feedback according to the frame type information in the signal field.

Preferably, the frame type information is carried through a combination of one or more bits of the signal field; and the detecting unit detects whether the radio frame is one which requests channel measurement feedback through the following manner: detecting whether a combination value of a combination, of the one or more bits is a preset value, if yes, then determining that the received radio frame is one which requests the channel measurement feedback, otherwise, determining that the received radio frame is not a radio frame which requests the channel measurement feedback.

By means of the disclosure, when a sending station sends out a radio frame, it carries indication information requesting channel measurement feedback in the signal field, which is in the physical layer header of the radio frame. Therefore the transmission load overhead and the power consumption of the station are reduced.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail., Note that, the embodiments of the disclosure and the features of the embodiments can be combined with each other if there is no conflict.

According to an embodiment of the disclosure, a method for indicating channel measurement feedback is provided. A sending station. sends a radio frame, with indication information requesting channel measurement feedback being carried in a signal field, which is in the physical layer header of the radio frame, and a receiving station feeds back channel measurement information after receiving the radio frame sent by the sending station, which may reduce the transmission load overhead, thereby reducing the power consumption of a station.

Figure 1:
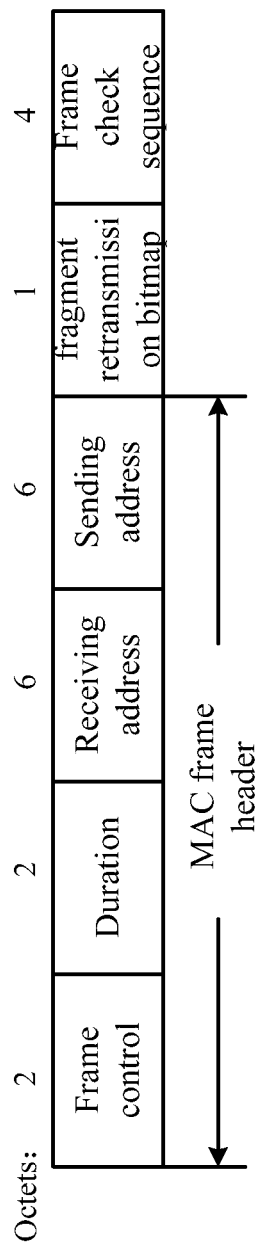
FIG. 1 is a structural schematic diagram of a beamforming report poll frame according to the related art.
Figure 2:
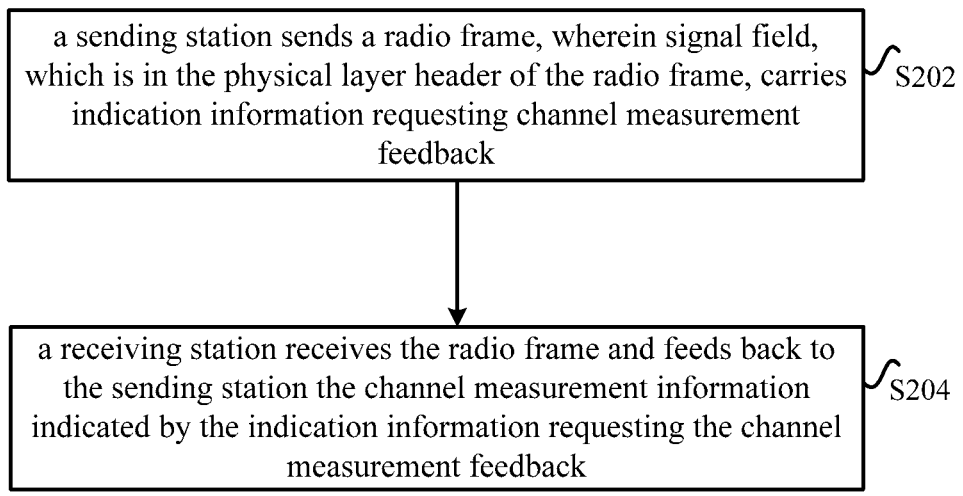
FIG. 2 is a flowchart of a method for indicating channel measurement feedback according to the disclosure.

FIG. 2 is a flowchart of a method for indicating channel measurement feedback according to an embodiment of the disclosure, as shown in FIG. 2, the method may comprise the following steps (step S202 to step S204).

Step S202, a sending station sends a radio frame, wherein signal field, which is in the physical layer header of the radio frame, carries indication information requesting channel measurement feedback.

Step S204 a receiving station receives the radio frame and feeds back to the sending station the channel measurement information indicated by the indication information requesting the channel measurement feedback.

By means of the embodiment of the disclosure, when a sending station sends a radio frame, the signal field, which is in the physical layer header of the radio frame, carries indication information requesting the channel measurement feedback, and a receiving station receives the radio frame sent by the sending station and feeds back to the sending station the channel measurement information indicated by the indication information requesting the channel measurement feedback, which effectively reduces the transmission load overhead and reduces the power consumption of the station.

In a preferred implementation of the embodiment of the disclosure, the indication information requesting the channel measurement feedback may comprise: frame type information and fragment retransmission bitmap information. The frame type refers to a type of a frame which requests the channel measurement feedback, the frame type information indicates that the radio frame is one requesting the channel measurement feedback, and the fragment retransmission bitmap refers to the fragment indication information of the channel measurement information to be fed back. Therefore, the receiving station receives the radio frame sent by the sending station, detects whether the received radio frame is one requesting the channel measurement feedback according to the frame type information carried in the signal field which is in the physical layer header of the radio frame, if yes, then the receiving station sends the channel measurement feedback information, which is indicated by the fragment retransmission bitmap information, to the sending station.

Furthermore, the frame type information of the radio frame may be carried in one or more subfields of the physical layer header. The frame type of the radio frame is indicated by the values of the one or more subfields. In particular, the modulation and coding, scheme (MCS) subfield in the signal field, which is in the physical layer header of the radio frame, may be multiplexed to carry the frame type information of the radio frame, and the frame type of the radio frame is indicated by the value of the MCS subfield. If the value of the MCS subfield is a preset value, then the radio frame is one requesting the channel measurement feedback; or, the MCS subfield and other subfields in the common signal field, which is in the physical layer header of the radio frame, may be multiplexed to carry the frame type information, and the frame type of the radio frame is indicated by a combination value of the MCS subfield and other subfields, and if the combination value of the MCS subfield and other subfields is a preset value, then the radio frame is one requesting the channel measurement feedback.

When indicating the type of the radio frame by multiplexing the MCS subfield, the value which indicates the type of the radio frame is a value which is not used in the MCS subfield. If the values which are not used in the MCS subfield still have other uses, then a specific value in the unused values may be designated to indicate the type of the radio frame. Correspondingly, when the receiving station detects whether the radio frame is one requesting, the channel measurement feedback according to the frame type information, it detects whether the value of the MCS subfield is a preset value, or whether a combination value of the MCS and other subfields is a preset value, if yes, then it is determined that the received radio frame is one requesting the channel measurement feedback, otherwise, it is determined that the received radio frame is not a radio frame requesting the channel measurement feedback.

In another implementation of the embodiment of the disclosure, the physical layer header may also comprise: a short training sequence and a long training sequence. The long training sequence consists of a plurality of OFDM symbols. When the sending station sends the radio frame, a phase difference between at least two OFDM symbols in the long training sequence field may be used for indicating that the signal field, which is in the physical layer header of the radio frame, is not a common signal field. After receiving the radio frame, the receiving station detects whether there is phase difference between at least two OFDM symbols in the long training sequence field of the received radio frame, if yes, then it is determined that the signal field of the radio frame is not a common signal field, and furthermore, the receiving; station detects the frame type indication information in the signal field to determine the frame type of the radio frame.

In a preferred implementation of the embodiment of the disclosure, the signal field, which is in the physical layer header of the radio frame, also carries a cyclic redundancy check sequence, which includes the check information of the information carried in the signal field, or the joint check information of the information carried in the signal field and the additional information carded in other fields of the radio frame. The additional information carried in the other fields may be basic service set identifier (BSSID) information, or partial BSSID information, and the partial BSSID information refers to compressed BSSID. After receiving the radio frame, the receiving station may check the cyclic redundancy check sequence in the radio frame, if the check is wrong, then this radio frame will be discarded, and if the check is right, then the next processing will be performed.

Preferably, the signal field which is in the physical layer header of the radio frame also carries address information. In the case where the address information of the radio frame merely contains an address field, when the radio frame is sent to the AP by the STA or sent to the STA by the AP, the address information may include: the associated identifier (AID) of the STA. In the case where the address information of the radio frame includes: receiving address information and. sending address information, when the radio frame is sent to the AP by the STA, the receiving address information is the basic. service set identifier (BSSID) of the AP, and the sending address information may be the associated identifier (AID) of the STA; or, when the radio frame is sent to the STA by the AP, the receiving address information is the AID of the STA, and the sending address information is the partial BSSID of the AP. The partial .BSSID may be compressed BSSID.

In a preferred implementation of an embodiment of the disclosure, the signal field also carries reserved channel access time. After receiving the radio frame, the receiving station determines whether the signal field is one not used for the common signal field by parsing the difference between adjacent OFDM symbols in the long training sequence. Furthermore, the receiving station receives the cyclic redundancy check sequence, if the check is wrong, then this frame will be discarded. if the check is right, then the frame type information in the received signal field will be further parsed to determine that this radio frame is one requesting the channel measurement feedback. However if the address information in the signal field does not match with its own AID, then the receiving station updates a network allocation vector (NAV in short) after making a detecting using the reserved channel access time in the signal field and discards this radio frame.

Preferably, in the embodiment of the disclosure, the radio frame merely contains the physical layer header, thereby being able to reduce the length of the radio frame and reduce the energy consumption when the sending station sends the radio frame.

By means of the embodiment of the disclosure, while ensuring that a function of requesting channel measurement feedback is completed, the transmission load overhead is reduced, thus reducing the power consumption of a station; in addition, the physical layer signalling usually employs the most reliable modulation and coding scheme, and the function indication is placed into the physical layer signalling for transmission, improving the transmission reliability.

Hereinafter, the disclosure will be described with particular embodiments.

Embodiment 1

According to an embodiment of the disclosure, Beamforming is performed according to 802.11ah, Beamformer (sending station) is an AP, Beamformee (receiving station) is a station STA-1, and the STA-1 does not immediately feed back channel measurement information to the AP after completing channel measurement. After a period of time, the AP has to perform Beamforming transmission with the STA-1, but the AP does not have the effective channel information between the AP and the STA-1.

At this moment, the AP sends a radio frame which has a function of requesting channel measurement feedback. The radio frame merely contains three fields: a short training sequence field, a long training sequence field and a signal field, wherein two adjacent OMNI symbols in the long training sequence field have a determined phase shift, the frame type subfield in the signal field indicates that this frame is one requesting channel measurement feedback; in addition, the signal field of this radio frame also carries fragment indication information of the channel measurement information to be fed back to indicate to feed back all fragments, the associated identifier (AID) of the STA-1, reserved channel access time and cyclic redundancy check sequence. The cyclic redundancy check sequence may be one of the following three which is agreed by both parties in advance: a check sequence singly aimed at the signal field, or a joint check sequence which is aimed at the signal field and additional information which is partial BSSID, or a joint check sequence which is aimed at the signal field and additional information which is BSSID.

The STA-1 receives the radio frame, determines whether the received signal field is one not used. for the common signal field by parsing the difference between adjacent OFDM symbols in the long training sequence field, checks the cyclic redundancy check sequence, if the check is wrong, discards this frame, if the check is right, further parses the frame type information field, in the received signal field. If it is determined that this radio frame is one requesting channel measurement feedback, and the address field in the signal field matches with its own AID, then after having waited for a short inter-frame interval, the STA-1 feeds back complete channel measurement feedback information to the AP according to the indication of the fragment transmission bitmap information in the signal field.

After receiving this radio frame, the other receiving stations determine that this signal field is one not used for the common signal field by parsing the difference between adjacent OFDM symbols in the long training sequence field, check the cyclic redundancy check sequence, if the check is wrong, discard this frame, if the check is right, further parse the frame type information field in the received signal field. If it is determined that this radio frame is one requesting channel measurement feedback, and the address filed in the signal field does not match with its own AID, then the receiving stations update their own NAV after making a detecting using the reserved channel access time in the signal field and discards this frame.

Embodiment 2

According to an embodiment of the disclosure, Beamforming transmission is performed according to 802.11ah, Beamformer (sending station) is a station STA-1, Beamformee (receiving station) is an AP, and at the same time, the AP feeds back the channel feedback information with N fragments, where the value of N is an integer greater than or equal to 1 and less than or equal to 7, and the STA-1 merely receives the channel measurement information with n fragments fed back by the. AR At this moment, the STA-1 sends a radio frame requesting channel measurement feedback, wherein the radio frame merely contains three fields: a short training sequence field, a long training sequence field and a signal field, wherein there is a determined phase shift between two adjacent OFDM symbols in the long training sequence field, the frame type subfield in the signal field indicates that this radio frame is one requesting channel measurement feedback; in addition, the signal field of this radio frame also carries fragment indication information of the channel measurement information to he fed back to indicate to feed back fragments which does not received correctly, the associated identifier (AID) of the STA-1, reserved channel access time and cyclic redundancy check sequence, wherein the check sequence may be one of the following three which is agreed by both parties in advance: a check sequence singly aimed at the signal field, or a joint check sequence which is aimed at the signal field and additional information which is partial BSSID, or a joint check sequence which is aimed at the signal field and additional information which is BSSID.

The AP receives the radio frame, determines that the received signal field is one not used for the common signal field by parsing the difference between adjacent OFDM symbols in the long training sequence field, The AP checks the cyclic redundancy check sequence, if the check is wrong, discards this frame, if it is right, further parses the frame type information field in the received signal field, and determines that this radio frame is one requesting channel measurement feedback. If the address field, which is parsed by the AP, in the signal field is the AID of the STA-1, then it means STA-1 is requesting channel measurement information feedback. After having waited for a short inter-frame interval, the STA-1 feeds back complete channel measurement feedback information to the AP according to the indication of the fragment transmission bitmap information in the signal field After receiving this radio frame, the other receiving stations determine that this signal field is one not used for the common signal field by parsing the difference between adjacent OFDM symbols in the long training sequence field. The other receiving stations check the cyclic redundancy check sequence, if the check is wrong, discard this frame, if the check is right, further parse the frame type information field in the received signal field, and determine that this radio frame is one requesting channel measurement feedback. However the address field in the signal field does not match with its own AID, then this receiving station updates its own NAV after making a detecting using the reserved channel access time in the signal field and discards this frame.

Embodiment 3

According to an embodiment of the disclosure, Beamforming is performed according to 802.11ah, Beamformer (sending station) is an AP, Beamformee is a station STA-1, and at the same time, the STA-1 does not immediately feed back channel measurement information to the AP after completing channel measurement. After a period of time, the AP has to perform Beamforming transmission with the STA-1, but the AP does not have the effective channel information between the AP and the STA-1.

At this moment, the AP sends a radio frame requesting channel measurement feedback, wherein the radio frame merely contains three fields: a short training sequence field, a long training sequence field and a signal field. The field which is originally used for MCS indication in the signal field is multiplexed as a frame type indication field. It is indicated that this multiplexed frame is one requesting channel measurement feedback through setting the value of this multiplexed field; in addition, the signal field of this radio frame also carries fragment indication information of the channel measurement information to be fed back to indicate to feed back all the fragments, the associated identifier (AID) of the STA-1, the reserved channel access time and cyclic redundancy check sequence, wherein the cyclic redundancy check sequence may be one of the following three which is agreed by both parties in advance: a check sequence singly aimed at the signal field, or a joint check sequence wined at the signal field and the additional information which is partial BSSID, or a joint check sequence aimed at the signal field and the additional information which is BSSID.

The STA-1 receives the radio frame, checks the cyclic redundancy check sequence, if it is wrong, then discards this frame, and if it is right, then further parses the MCS subfield. If the value of the MCS subfield is not within the normal value range, then the STA-a determines that the received signal field is not one used for the common signal field, and determines that this radio frame is one requesting channel measurement feedback according to the value of the MCS field and/or other fields. Furthermore, if the address field in the signal field matching with the AID of the STA-1, then the STA-1 feeds back the completed channel measurement information to the AP according to the indication of the fragment retransmission bitmap information in the signal field, after waiting for a short inter-frame interval.

After receiving this radio frame, the other stations check the cyclic redundancy check sequence, if it is wrong, then discard this frame, and if it is right, then further parse the MCS subfield, If the value of the MCS subfield is not within the normal value range, then the other stations determine that the received signal field is not one used for the common signal field, and determine that this ration frame is one requesting channel measurement feedback according to the value of the MCS field and/or other fields. Furthermore, if the address field in the signal field does not matching with the AID of the receiving station, then this receiving station updates its own NAV after making a detecting using the reserved channel access time in the signal field and discards this radio frame.

Embodiment 4

According to an embodiment of the disclosure, Beamforming transmission is performed according to 802.11ah, Beamformer (sending station) is an AP, Beamformee (receiving station) is a station STA-1, and at the same time, the STA-1 feeds back the channel feedback information with N fragments, where the value of N is an integer greater than or equal to 1 and less than or equal to 7, and the AP merely receives the channel measurement information with n fragments fed back by the nth STA-1.

At this moment, the AP sends a radio frame requesting channel measurement feedback, wherein the radio frame merely contains three fields: a short training sequence field, a long training sequence field and a signal field, wherein the field, which is originally used for MCS indication and is in the signal field, is multiplexed. It is indicated that the radio frame is one requesting channel measurement feedback through setting the value of the frame type field; in addition, the signal field of this radio frame also carries fragment indication information of the channel measurement information to be fed back to indicate to feed back all fragments, the associated identifier (AID) of the STA-1, reserved channel access time and cyclic redundancy check sequence. The cyclic redundancy check sequence may be one of the following three which is agreed by both parties in advance: a check sequence singly aimed at the signal field, or a joint check sequence which is aimed at the signal field and additional information which is partial BSSID, or a joint check sequence which is aimed at the signal field and additional information which is BSSID.

The STA-1 receives the radio frame, checks the cyclic redundancy check sequence, if it is wrong, then discards this frame, and if it is right, then further parses the MCS subfield. If the value of MCS subfield is not within the normal value range, then determines that the received signal field is not one used for the common signal field and determines that this frame is one requesting channel measurement feedback according to the value of the MCS field and/or other fields. Furthermore, if the address field in the signal field matches with the AID of the STA-1, the STA-1 feeds back the channel measurement information which is not transmitted correctly in the previous transmission of the AP to the AP again according to the indication of the fragment retransmission bitmap information in the signal field after waiting for a short inter-frame interval.

After receiving this frame, the other stations check the cyclic redundancy check sequence, if it is wrong, then discard this frame, and if it is right, then further parse the MCS subfield. If the value of the MCS subfield is not within the normal value range, then determine that the received signal field is not one used for the common signal field, and determine that this frame is one requesting channel measurement feedback according to the value of the MCS field and/or other fields. Furthermore, if the address field in the signal field does not match with its own AID, then this receiving, station updates its own NAV after making a detecting using the reserved channel access time in the signal field and discards this radio frame.

Embodiment 5

According to the an embodiment of the disclosure. Beamforming is performed according, to 802.11ah, Beamformer (sending station) is an AP, Beamformee is a station STA-1 and at the same time, the STA-1 does not immediately teed back channel measurement information to the AP after completing channel measurement. After a period of time, the AP has to perform Beamforming transmission with the STA-1, but the AP does not have the effective channel information between the AP and the STA-1.

At this moment, the AP sends a radio frame requesting channel measurement feedback, wherein the radio frame merely contains three fields: a short training sequence field, a long training sequence field and a signal field. The field which is originally used for MCS indication in the signal field is multiplexed as a frame type indication field, the value of this field is set to indicate that this frame is one requesting channel measurement feedback; in addition, the signal field of this radio frame also carries fragment indication information of the channel measurement information to be fed back to indicate to feed back all the fragments, the associated identifier (AID) of the STA-1, the reserved channel access time and cyclic redundancy check sequence, wherein the cyclic redundancy check sequence may be one of the following three which is agreed by both parties in advance: a check sequence singly aimed at the signal field, or a joint check sequence aimed at the signal field and the additional information which is partial BSSID, or a joint check sequence aimed at the signal field and the additional information which is BSSID.

The STA-1 receives the radio frame, checks the cyclic redundancy check sequence, if it is wrong, then discards this frame, and if it is right, then further parses the MCS subfield, If the value of the MCS subfield is not within the normal value range, then the STA-1 determines that the received signal field is not one used for the common signal field, and determines that this frame is one requesting channel measurement feedback according to the value of the MCS field and/or other fields. Furthermore, if the address field in the signal field matches with its own AID, then the STA-1 feeds back the complete channel measurement information to the AP according to the indication of the fragment retransmission bitmap information in the signal field after waiting for a short inter-frame interval.

After receiving this frame, the other stations cheek the cyclic redundancy check sequence, if it is wrong, then discard this frame, and if it is right, then further parse the MCS subfield, if the value thereof is not within the normal value range, then determine that the received signal field is not one used for the common signal field, determine that this frame is one having a function of requesting channel measurement feedback according to the value of the MCS field and/or other fields, with the address field in the signal field not matching with its own AID, then this receiving station updates its own NAV after making a detecting using the reserved channel access time in the signal field and discards this frame.

Embodiment 6

According to an embodiment of the disclosure, Beamforming is performed according to 802.11ah, Beamformer (sending station) is an AP, Beamformee is a station STA-1, and at the same time, the STA-1 does not immediately feed back channel measurement information to the AP after completing channel measurement. After a period of time, the AP has to perform Beamforming transmission with the STA-1, but the AP does not have the effective channel information between the AP and the STA-1.

At this moment, the AP sends a radio frame requesting channel measurement feedback, wherein the radio frame merely contains three fields: a short training sequence field, a long training sequence field and a signal field. The field which is originally used for MCS indication in the signal field is multiplexed as a frame type indication field, the value of this field is set to indicate that this radio frame is one requesting channel measurement feedback; in addition, the signal field of this radio frame also carries fragment indication information of the channel measurement information to be fed back to indicate to feed back all the fragments, the associated identifier (AID) of the STA-1, BSSID, the reserved channel access time and cyclic redundancy check sequence, wherein the cyclic redundancy check sequence may be one of the following three which is agreed by both parties in advance: a check sequence singly aimed at the signal field, or a joint check sequence aimed at the signal field and the additional information which is partial BSSID, or a joint check sequence aimed at the signal field and the additional information which is BSSID. During particular implementation, to use which check sequence may be negotiated by both parties in advance.

The STA-1 receives the radio frame, checks the cyclic redundancy check sequence, if it is wrong, then discards this frame, and if it is right, then further parses the MCS subfield. If the value of the MCS subfield is not within the normal value range, then the STA-1 determines that the received signal field is not one used for the common signal field, and determines that this radio frame is one requesting channel measurement feedback according to the value of the MCS field and/or other fields. The STA-1 parses the address information in the signal field. If the address field in the signal field matches with the AID, then the STA-1 feeds back the complete channel measurement information to the AP according to the indication of the fragment retransmission bitmap information in the signal field after waiting for a short inter-frame interval.

After receiving this frame, the other stations check the cyclic redundancy check sequence, if it is wrong, then discard this frame, and if it is right, then further parse the MCS subfield. If the value, of the. MCS subfield is not within the normal value range, then the other stations determine that the received signal field is not one used for the common signal field, and determine that this frame is One requesting channel measurement feedback according to the value of the MCS field and/or other fields. Furthermore, if the address field in the signal field does not match with the AID of the receiving station, then this receiving station updates its own NAV after making a detecting using the reserved channel access time in the signal field and discards this frame.

Embodiment 7

According to an embodiment of the disclosure, Beamforming is performed according to 802.11ah. Beamformer (sending station) is an AP, Beamformee is a station STA-1, and at the same time, the STA-1 does not immediately feed back channel measurement information to the AP after completing channel measurement. After a period of time, the AP has to perform Beamforming transmission with the STA-1, but the AP does not have the effective channel information between the AP and the STA-1.

At this moment, the AP sends a radio frame requesting channel measurement feedback, wherein the radio frame merely contains three fields: a short training sequence field, a long training sequence field and a signal field, wherein N bits in the signal field is used for indicating the frame type, where the value of N is an integer greater or equal to 1, the combination value of N bits indicates that the frame is one requesting channel measurement feedback; in addition, the signal field of this radio frame also carries fragment indication information of the channel measurement information to be fed back to indicate to feed back all fragments, the associated identifier (AID) of the STA-1, reserved channel access time and cyclic redundancy check sequence, wherein the cyclic, redundancy check sequence may be one of the following three which is agreed by both parties in advance: a check sequence singly aimed at the signal field, or a joint check sequence which is aimed at the signal field and additional information which is partial BSSID, or a joint check sequence which is aimed at the signal field and additional information which is BSSID.

The STA-1 receives the radio frame, checks the cyclic redundancy check sequence, if it is wrong, then discards this frame, and if it is right, then determines that this radio frame is a frame requesting channel feedback by parsing N bits in the signal field, wherein the N bits is for indicating the frame type. Furthermore, the STA-1 determines that the address field in the signal field matches with its own AID, then the STA-1 feeds back the complete channel measurement information to the AP according to the indication of the fragment retransmission bitmap information in the signal field, after waiting for a short inter-frame interval.

After receiving this frame, the other stations check the cyclic redundancy check sequence, if it is wrong, then discard this frame, and if it is right, then determine that this radio frame is a frame which has a function of requesting channel feedback by parsing N bits in the signal field, wherein the N bits is for indicating the frame type. However the address field in the signal field does not match with its own AID, then this receiving station updates its own NAV after making a detecting using the reserved channel access time in the signal field and discards this frame.

According to the embodiment of the disclosure, a sending station is provided, Which may send indication information requesting channel measurement feedback to a receiving station, which effectively reduces the transmission load overhead while ensuring that a function of requesting channel measurement feedback is completed, thereby reducing the power consumption of a station.

Figure 3:
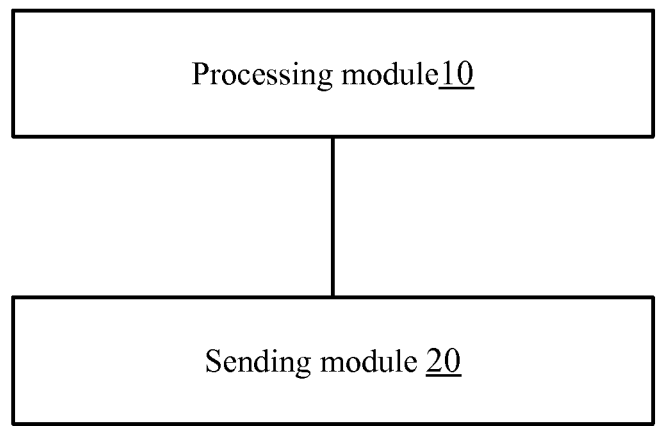
FIG. 3 shows a schematic diagram of a sending station according to an embodiment of the disclosure.

FIG. 3 shows a schematic diagram of a sending station according to an embodiment of the disclosure, as shown in FIG. 3, the sending station includes a processing module 10 and a sending module 20. The processing module 10 is configured to carry indication information requesting channel measurement feedback in a signal field which is in the physical layer header of a radio frame; and the sending module 20 is coupled to the processing module 10 and configured to sending the radio frame.

By means of the embodiment of the disclosure, the processing module 10 carries the indication information requesting the channel measurement feedback in the signal field which is in the physical layer header of a radio frame; and the sending module 20 sends the radio frame processed by the processing module 10. The transmission load overhead is effectively reduced, thereby reducing the power consumption of the station.

Preferably, the indication information requesting the channel measurement feedback may comprise: frame type information and fragment retransmission bitmap information. The frame type refers to the type of a frame requesting the channel measurement feedback, the frame type information indicates that the radio frame is a frame requesting channel measurement feedback, and the fragment retransmission bitmap refers to the fragment indication information of the channel measurement information to be fed back.

In a preferred implementation of the embodiment of the disclosure, the processing module 10 may carry the frame type information via a combination of one or more bits in the signal field which is in the physical layer header of the radio frame.

In a preferred implementation of the embodiment of the disclosure, the processing module 10 may carry the frame type information by multiplexing one or more subfields in the signal field which is in the physical layer header of the radio frame. Preferably, the modulation and coding scheme (MCS) subfield in the signal field, which is in the physical layer header of the radio frame, may be multiplexed to carry the frame type information of the radio frame, and the frame type of the radio frame is indicated by the value of the MCS subfield. If the value of the MCS subfield is a preset value, then the radio frame is one requesting channel measurement feedback; or, the MCS subfield and other subfields in the common signal field, which is in the physical layer header of the radio frame, may be multiplexed to carry the frame type information, and the frame type of the radio frame is indicated by a combination value of the MCS subfield and other subfields. If the combination value of the MCS subfield, and other subfields is a preset value, then the radio frame is one requesting channel measurement feedback.

Preferably, the physical layer header of the radio frame sent by the sending station may also comprise: a short training sequence field and a long training sequence field, wherein the long training sequence field consists of a plurality of orthogonal frequency division multiplexing (OFDM) symbols. The signal field, which is in the physical layer header of the radio frame, may be indicated by the sending station not to be a common signal field through the phase difference between at least two OFDM symbols in the long, training sequence field. After receiving the radio frame, the receiving station detects whether there is a phase difference between at least two OFDM symbols in the long training sequence field of the received radio frame, if yes, then it is determined that the signal field of the radio frame is not a common signal field, and furthermore, the receiving station detects the frame type indication information in the signal field to determine the frame type of the radio frame.

In a preferred implementation of the embodiment of the disclosure, the signal field, which is in the physical layer header of the radio frame sent by the sending station, also carries a cyclic redundancy check sequence, which includes the check information of the information carried in the signal field, or the joint check information of the information carried in the signal field and the additional information carried in other fields of the radio frame. The additional information carried in the other fields may be basic service set identifier (BSSID) information, or partial BSSID information, and the partial BSSID information refers to compressed BSSID. Correspondingly, after receiving the radio frame, the receiving station may check the cyclic redundancy check sequence in the radio frame, if it is wrong, then this radio frame will be discarded, and if it is right, then the next processing will be performed.

Preferably, the signal field, which is in the physical layer header of the radio frame sent by the sending station, also carries address information, and the sending station may be an STA or an AP. In the case where the address information of the radio frame merely contains one address field, when the radio frame is sent by the AP by the STA, or sent to the STA by the AP, the address information may include: the associated identifier (AID) of the STA. In the case where the address information of the radio frame includes: receiving address information and sending address information, when the radio frame is sent to the AP by the STA, then the receiving address information is the partial basic service set identifier (BSSID) of the AP, and the sending address information may be the associated identifier (AID) of the STA; or when the radio frame is sent to the STA by the AP the receiving address information is the AID of the STA, and the sending address information is the partial BSSID of the AP. The partial BSSID may be compressed BSSID. The load of the radio frame can be lowered after compressing BSSID, thus reducing the energy consumption when the sending station sends the radio frame.

In a preferred implementation of the embodiment of the disclosure, the signal field sent by the sending station also carries reserved channel access time. Correspondingly, if the receiving station determines that the address information in the signal field does not match with its own AID, then the receiving station updates a network allocation vector after making a detecting using the reserved channel access time in the signal field and discards this radio frame.

In another preferred implementation of the embodiment of the disclosure, the radio frame sent by the sending station merely includes the physical layer header, According to an embodiment of the disclosure, a receiving station is also provided, corresponding to the sending station and the method provided in the above-mentioned embodiments of the disclosure, for receiving a radio frame sent by the sending, station and feeding back channel measurement information to the sending: station, which can reduce the transmission load, overhead, thereby reducing the power consumption of a station.

Figure 4:
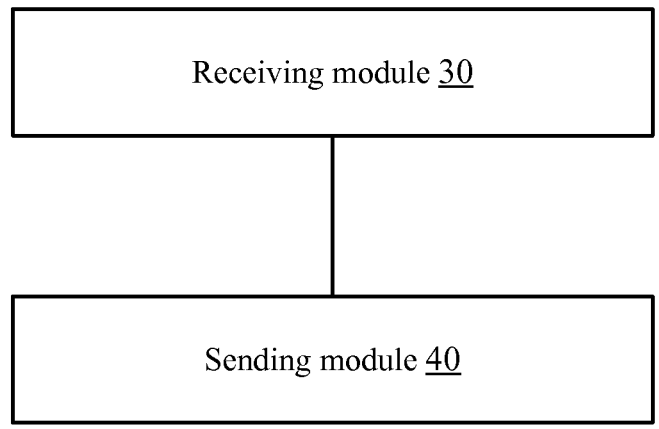
FIG. 4 shows a schematic diagram of a receiving station according to an embodiment of the disclosure.

FIG. 4 shows a schematic diagram of a receiving station according to an embodiment of the disclosure, as shown in FIG. 4, the device mainly includes a receiving module 30 and a sending module 40. The receiving module 30 is configured to receive a radio frame which is sent by a sending station and carries indication information requesting channel measurement feedback, wherein the indication information requesting the channel measurement feedback is carried in the signal field, which is in the physical layer header of the radio frame; and the sending module 40 is coupled to the receiving module 30 and configured to feed back the channel measurement information indicated by the indication information requesting the channel measurement feedback to the sending station.

By means of the embodiment of the disclosure, the receiving station 30 receives a radio frame sent by the sending station, the sending module 40 feeds back to the sending station the channel measurement information indicated by the indication information requesting channel measurement feedback according to the indication information requesting the channel measurement feedback, wherein the indication information requesting the channel measurement feedback is carried in the signal field which is in the physical layer header of the radio frame. The above-mentioned solution effectively reduces the transmission load overhead and reduces the power consumption of the station.

Figure 5:
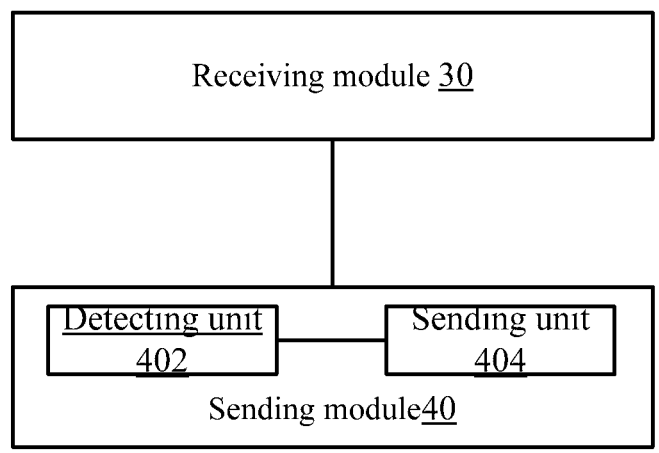
FIG. 5 is a schematic diagram of a receiving station according to a preferred embodiment of the disclosure.

The indication information requesting the channel measurement feedback may comprise: frame type in formation and fragment retransmission bitmap information. Therefore, when the receiving station feeds back the channel measurement information indicated by the indication information requesting the channel measurement feedback to the sending station, the receiving station may detect whether the received radio frame is one which requests channel measurement feedback according, to the frame type information; if yes, then the receiving station sends the channel measurement feedback information indicated by the fragment retransmission bitmap information to the sending station. Therefore, in a preferred implementation of the embodiment of the disclosure, as shown in FIG. 5, the sending module 40 may include: a detecting unit 402 configured to determine whether the radio frame is one which requests channel measurement feedback according to the frame type information; and the sending unit 404 configured to, if the detecting result of the detecting unit 402 is yes, send the channel measurement feedback information indicated by the fragment transmission bitmap information to the sending station.

In a preferred implementation of the embodiment of the disclosure, the frame type information may be carried, in one or more subfields of the signal field, such as reserved information field. When the detecting unit 402 detects whether the radio frame is one which requests channel measurement feedback according to the frame type information, the detecting unit 402 may detects whether the value of one or more subfields of the signal field is a preset value, if yes, then determines that the received radio frame is one which requests the channel measurement feedback, otherwise, determines that the received radio frame is not one which requests the channel measurement feedback.

Furthermore, the frame type information may be carried in the MCS subfield. The detecting unit 402 may detect whether the value of the MCS subfield is a preset value, if yes, then determine that the received radio frame is one which requests the channel measurement feedback, otherwise, determine that the received radio frame is not a radio frame which requests the channel measurement feedback. Alternatively, the frame type information ma be carried in the MCS subfield and other subfields. The detecting unit 402 may detect whether a combination value of the MCS subfield and other subfields is a preset value, if yes, then determine that the received radio frame is one which requests the channel measurement feedback, otherwise, determine that the received radio frame is not a radio frame which requests the channel measurement feedback.

In a preferred implementation of the embodiment of the disclosure, the frame type information is carried in a combination of one or more bits in the signal field, and the detecting unit 402 detects whether the radio frame is one which requests the channel measurement feedback in the following manner: detecting whether the combination value of the one or more bits is a preset value, if yes, then determining that the received radio frame is one which requests the channel measurement feedback, otherwise, determining that the received radio frame is not a radio frame which requests the channel measurement feedback.

In another preferred implementation of the embodiment of the disclosure, the physical layer header may also comprise: a short training sequence field and a long training sequence field. The long training sequence field consists of a plurality of OFDM symbols. The sending station indicates that the signal field, which is in the physical layer header of the radio frame, is not a common signal field according to a phase difference between at least two OFDMs in the long training sequence field, After the receiving station receives the radio frame, the detecting unit 402 thereof detects whether there is phase difference between at least two OFDM symbols in the long training sequence field of the received radio frame, if yes, then it is determined that the signal field of the radio frame is not a common signal field, and furthermore, the detecting unit 42 detects the flume type indication information in the signal field to determine the frame type of the radio frame.

In another preferred implementation of the embodiment of the disclosure, the signal field, which is in the physical layer header of the radio frame, also carries a cyclic redundancy check sequence, which includes the check information of the information carried in the signal field, or the joint check information of the information carried in the signal field and the additional information carried in other fields of the radio frame. The additional information carried in the other fields may be basic service set identifier (BSSID) information, or partial BSSID information, and the partial BSSID information refers to compressed BSSID. After receiving the radio frame, the receiving station may check the cyclic redundancy check sequence in the radio frame, if it is wrong, then this radio frame will be discarded, and if it is right, then the next processing, will be performed.

Preferably, the signal field, which is in the physical layer header of the radio frame, also carries address information. In the case where the address information of the radio frame merely contains an address field, when the radio frame is sent to the AP by the STA or sent to the STA by the AP, the address information may include: associated identifier (AID) of the STA. In the case where the address information of the radio frame may include: receiving, address information and sending address information, when the radio frame is sent to the AP by the STA, the receiving address information is the basic service set identifier (BSSID) of the AP, and the sending address information may be the associated identifier (AID) of the STA; or, when the radio frame is sent to the STA by the AP, the receiving address information is the AID of the STA, and the sending address information is the partial BSSID of the AP. The partial BSSID may be compressed BSSID.

Therefore, after receiving the radio frame, the receiving station determines whether the signal field is one not used for the common signal field by parsing the difference between adjacent OFDM symbols in the long training sequence field. Furthermore, the receiving station checks the cyclic redundancy check sequence. If the check is wrong, then discards this frame, and if it is right, then further parses the frame type information in the received signal field, and determines that this radio frame is a radio frame requesting the channel measurement feedback. Furthermore, if the address information in the signal field matches with the AID of the receiving station, then the receiving station returns corresponding channel measurement information to the sending station. In a preferred implementation of the embodiment of the disclosure, the signal field also carries reserved channel access time. If the address information in the signal field does not match with the AID of the receiving station, then the receiving station updates a network allocation vector after making a detecting using the reserved channel access time in the signal field and discards this radio frame.

It can be seen from the above description that the disclosure realizes the following technical effects: a receiving station receives a radio frame sent by a sending station, and according to the indication information requesting channel measurement feedback carried in the signal field which is in the physical layer header of the radio frame, feeds back to the sending station the channel measurement information indicated by the indication information requesting the channel measurement feedback. The above-mentioned solution effectively reduces the transmission load overhead while ensuring that a function of requesting channel measurement feedback is completed, thereby reducing the power consumption of a station; in addition, the physical layer signalling usually employs the most reliable modulation and coding scheme and places the function indication in the physical layer signalling for transmission, which can improve the transmission reliability.

Obviously, those skilled in the art should know that each of the mentioned modules or steps of the disclosure can be realized by universal computing devices; the modules or steps can be focused on single computing, device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method for indicating channel measurement feedback, comprising:
   a sending station sending a radio frame to a receiving station, wherein indication information for requesting channel measurement feedback is carried in a signal field which is in a physical layer header of the radio frame;
   wherein the indication information for requesting channel measurement feedback comprises: frame type information and fragment retransmission bitmap information;
   the sending station receiving channel measurement information, which is feed back by the receiving station according to the indication information which the receiving station has received.

2. The method according to claim 1, wherein when the sending station sends the radio frame, the frame type information is carried through a combination of one or more bits in the signal field which is in the physical layer header of the radio frame.

3. The method according to claim 1, wherein when the sending station sends the radio frame, one or more subfields in the signal field, which is in the physical layer header of the radio frame, are multiplexed to carry the frame type information;
   wherein multiplexing the one or more subfields in the signal field, which is in the physical layer header of the radio frame, to carry the frame type information comprises:
   multiplexing a modulation and coding scheme (MCS) subfield in the signal field, which is in the physical layer header of the radio frame, to carry the frame type information, and indicating a frame type of the radio frame via a value of the MCS subfield, wherein if the value of the MCS subfield is a preset value, then the radio frame is one which requests the channel measurement feedback; or
   multiplexing the MCS subfield and other subfields in a common signal field, which is in the physical layer header of the radio frame, to carry the frame type information, and indicating the frame type of the radio frame via a combination value of the MCS subfield and the other subfields, wherein if the combination value is a preset value, then the radio frame is one which requests the channel measurement feedback.

4. The method according to claim 1, wherein the signal field further carries address information;
   wherein the address information comprises: receiving address information and sending address information; wherein,
   when the radio frame is sent to an access point (AP) by a station (STA), the receiving address information is partial basic service set identifier (BSSID) of the AP, and the sending address information is an associated identifier (AID) of the STA, wherein the partial BSSID is a compressed BSSID; or
   when the radio frame is sent to the STA by the AP, the receiving address information is the AID of the STA, and the sending address information is the partial BSSID of the AP.

5. The method according to claim 1, wherein the signal field further carries cyclic redundancy check information, wherein the cyclic redundancy check information comprises: check information of the signal field information, or the joint check information of the signal field information and additional information.

6. The method according to claim 1, wherein the physical layer header of the radio frame further comprises: a short training sequence field and a long training sequence field, wherein the long training sequence field consists of a plurality of orthogonal frequency division multiplexing (OFDM) symbols.

7. The method according to claim 6, wherein it is indicated that the signal field, which is in the physical layer header of the radio frame, is not the common signal field through a phase difference between at least two OFDM symbols in the long training sequence field.

8. The method according to claim 1, wherein the radio frame merely comprises the physical layer header.

9. A sending station, comprising a processor configured to execute program modules stored on a memory, wherein the program modules comprise:
   a processing module connected with a sending module and configured to carry indication information for requesting channel measurement feedback in a signal field which is in a physical layer header of a radio frame; and
   the sending module connected with the processing module and configured to send the radio frame to a receiving station;
   wherein the indication information for requesting the channel measurement feedback comprises: frame type information and fragment retransmission bitmap information;
   the sending station is also configured to receive channel measurement information, which is feed back by the receiving station according to the indication information which the receiving station has received.

10. The sending station according to claim 9, wherein the processing module carries the frame type information through a combination of one or more bits in the signal field which is in the physical layer header of the radio frame.

11. The sending station according to claim 9, wherein the processing module carries the frame type information by multiplexing one or more subfields in the signal field, which is in the physical layer header of the radio frame, through the following manner:

> multiplexing a modulation and coding scheme (MCS) subfield in the signal field, which is in the physical layer header of the radio frame, to carry the frame type information, and indicating a frame type of the radio frame via a value of the MCS subfield, wherein if the value of the MCS subfield is a preset value, then the radio frame is one which requests the channel measurement feedback; or
>
> multiplexing the MCS subfield and other subfields in a common signal field, which is in the physical layer header of the radio frame, to carry the frame type information, and indicating the frame type of the radio frame via a combination value of the MCS subfield and the other subfields, wherein if the combination value is a preset value, then the radio frame is one which requests the channel measurement feedback.

12. The sending station according to claim 9, wherein the physical layer header of the radio frame further comprises: a short training sequence field and a long training sequence field, wherein the long training sequence field consists of a plurality of orthogonal frequency division multiplexing (OFDM) symbols.

13. The sending station according to claim 12, wherein the radio frame merely comprises the physical layer header.

14. A receiving station, comprising a processor configured to execute program modules stored on a memory, wherein the program modules comprise:

> a receiving module connected with a sending module and configured to receive a radio frame which is sent by a sending station and carries indication information for requesting channel measurement feedback, wherein the indication information for requesting the channel measurement feedback is carried in a signal field which is in the physical layer header of the radio frame; and
>
> the sending module connected with the processing modules and configured to feed back channel measurement information, according to the indication information for requesting the channel measurement feedback, to the sending station;
>
> wherein the indication information for requesting the channel measurement feedback comprises: frame type information and fragment retransmission bitmap information.

15. The receiving station according to claim 14, wherein the indication information for requesting the channel measurement feedback comprises: frame type information and fragment retransmission bitmap information; and wherein the sending module comprises:

> a detecting unit connected with a sending unit and configured to detect whether the radio frame is one which requests the channel measurement feedback according to the frame type information; and wherein
>
> the sending module connected with the processing module and configured to, if a detecting result is yes, send the channel measurement feedback information, which is indicated by fragment transmission bitmap information, to the sending station.

16. The receiving station according to claim 15, wherein the frame type information is carried in one or more subfields of the signal field; and the detecting unit detects whether the radio frame is one which requests the channel measurement feedback through the following manner:

> detecting whether values of the one or more subfields are preset values, if yes, then determining that the received radio frame is one which requests the channel measurement feedback, otherwise, determining that the received radio frame is not a radio frame which requests the channel measurement feedback.

17. The receiving station according to claim 15, wherein the physical layer header further comprises: a short training sequence field and a long training sequence field; and the detecting unit detects whether the radio frame is one which requests the channel measurement feedback through the following manner:

> detecting whether there is a phase difference between at least two OFDM symbols in the long training sequence field of the radio frame, if yes, then determining that the signal field of the radio frame is not a common signal field, and determining whether the radio frame is one which requests the channel measurement feedback according to the frame type information in the signal field.

18. The receiving station according to claim 15, wherein the frame type information is carried through a combination of one or more bits of the signal field; and the detecting unit detects whether the radio frame is one which requests channel measurement feedback through the following manner: detecting whether a combination value of a combination of the one or more bits is a preset value, if yes, then determining that the received radio frame is one which requests the channel measurement feedback, otherwise, determining that the received radio frame is not a radio frame which requests the channel measurement feedback.

* * * * *